(12) United States Patent
Leland et al.

(10) Patent No.: US 6,216,343 B1
(45) Date of Patent: Apr. 17, 2001

(54) METHOD OF MAKING MICRO CHANNEL HEAT PIPE HAVING CORRUGATED FIN ELEMENTS

(75) Inventors: John E. Leland, Kettering; Rengasamy Ponnappan, Centerville, both of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/389,270

(22) Filed: Sep. 2, 1999

(51) Int. Cl.[7] ..................................................... B23P 15/00
(52) U.S. Cl. .................................. 29/890.032; 29/890.03
(58) Field of Search ........................ 29/890.032, 890.03, 29/557, 428, 890.054; 165/104.26

(56) References Cited

U.S. PATENT DOCUMENTS

| | | | |
|---|---|---|---|
| 4,353,415 | * 10/1982 | Klaschka et al. | 29/890.032 |
| 4,846,263 | * 7/1989 | Miyazaki et al. | 29/890.032 |
| 6,070,654 | * 6/2000 | Ito | 165/104.26 |
| 6,077,566 | * 6/2000 | Henne et al. | 29/890.032 |

OTHER PUBLICATIONS

"Micro/Miniature Heat Pipe Technology for Electronic Cooling", by Faghri et al., WL–TR–97–2083, Wright Laboratory, Wright–Patterson AFB, OH (Jul. 1997).

* cited by examiner

Primary Examiner—Irene Cuda
(74) Attorney, Agent, or Firm—Richard A. Lambert; Bobby D. Scearce; Thomas L. Kundert

(57) ABSTRACT

A corrugated fin heat pipe and method of fabrication. The micro channel heat pipe includes a tubular housing split longitudinally into two halves. A pair of corrugated fin elements defining a plurality of adjacent closed and open micro capillary channels are attached to the inner surface of the housing halves. Material is removed from the closed micro capillary channels along a portion of the longitudinal axis to create regions consisting entirely of open micro capillary channels, maximizing heat flux in those regions. The housing halves are reattached and the heat pipe housing is enclosed by a pair of end caps.

14 Claims, 4 Drawing Sheets

METHOD OF MAKING MICRO CHANNEL HEAT PIPE HAVING CORRUGATED FIN ELEMENTS

RIGHTS OF THE GOVERNMENT

The invention described herein may be manufactured and used by or for the Government of the United States for all governmental purposes without the payment of any royalty.

BACKGROUND OF THE INVENTION

The present patent application document is somewhat related to the copending and commonly assigned patent application document "MICRO CHANNEL HEAT PIPE HAVING WIRE CLOTH WICK AND METHOD OF FABRICATION", AFD 00344, Ser. No. 09/389,269 filed on even date herewith. The contents of that even filing date application are hereby incorporated by reference herein.

The present invention relates generally to heat dissipating devices and more particularly to a micro channel heat pipe and method of fabrication.

As is well known in the art, heat pipes are closed, self contained devices that contain a volatile working fluid designed to transport thermal energy efficiently. In general, heat pipes have an inner cavity lined with a wick or grooves designed to provide a capillary structure for the transport of the working fluid.

In operation, the heat pipe takes advantage of the latent heat of vaporization of the working fluid. Heat is applied to one portion of the device, causing evaporation of the fluid in that portion of the chamber. The fluid vapor moves to a cooler portion of the device whereupon it condenses. The condensed fluid returns, and the action repeats itself.

As can be imagined, this vaporization and condensation action is continuous and provides for a very efficient means of transportation of thermal energy. The heat pipe is a sealed unit and requires no additional energy input to enable operation. Thus it is very efficient and is useful in a wide array of applications.

A current trend towards micro miniaturization of electronic components and high power devices gives rise to the desirability of correspondingly miniaturized cooling devices. As a result, attempts have been made to miniaturize heat pipes. However, as heat pipes are miniaturized, it becomes increasingly difficult to fabricate an effective capillary channel structure to provide acceptable heat transfer operation. For example, forming of very narrow rectangular channels, 0.2 mm×0.9 mm or similar sizes and shapes within the internal walls of tubes with hydraulic diameter in the range of 5–10 mm is difficult. Appropriate groove cutting tools, extrusion dies and the like, necessary for cutting such small channels often provide unsatisfactory results and are expensive.

A need exists therefore for a micro channel heat pipe which provides high efficiency operation while simultaneously eliminating the difficulties encountered in fabrication heretofore encountered to date.

SUMMARY OF THE INVENTION

It is therefore a primary object of the present invention to provide a micro channel heat pipe and method of fabrication overcoming the limitations and disadvantages of the prior art techniques.

It is another object of the invention to provide a micro channel heat pipe that can be readily manufactured from known techniques.

It is still another object of the present invention to provide an improved micro channel heat pipe for efficient utilization in micro-miniature applications.

It is yet another object of the present invention to provide an improved micro channel heat pipe having corrugated fin elements for efficient heat transfer in micro-miniature applications.

Still another object of the present invention is to provide a method of fabrication of an improved micro channel heat pipe having corrugated fin elements wherein the closed channels are opened during fabrication to create enhanced localized heat transfer.

These and other objects of the invention will become apparent as the description of the representative embodiments proceeds.

In accordance with the foregoing principles and objects of the invention, a micro channel heat pipe and method of fabrication are described. The micro channel heat pipe includes a pair of corrugated fin elements attached to the inner walls of the tubular heat pipe housing. The heat pipe housing is enclosed by a pair of end caps and a working fluid is introduced therein.

Micro channel heat pipes are characterized as having at least one capillary channel such that $r_c/r_h \geq 1$ where $r_c$ is the capillary radius and $r_h$ is the hydraulic radius of the flow channel. In order to provide efficient operation, the capillary channels in micro channel heat pipes are quite small, for example, 0.2 mm or less. The known groove forming methods of the prior art, such as rolling, dicing saw cutting, electrodischarge machining, etc. are difficult to enact properly, can provide unsatisfactory results and are expensive to perform.

As stated, the micro channel heat pipe of the present invention includes a pair of corrugated fin elements attached to the inner surfaces of the heat pipe housing. The corrugated fin elements have a plurality of adjacent open and closed micro capillary grooves or channels formed therein. According to an important aspect of the present invention, material is removed from a portion of the closed micro capillary channels at each end of the heat pipe during fabrication. This creates sections comprised entirely of open micro capillary channels, doubling the number of channels available to the working fluid. This has the advantage of providing maximum heat transfer in the areas of high heat flux and can be used to create, for example, evaporator and condenser sections. Moreover, machining time is minimized because material is removed only in these areas, reducing fabrication time and costs.

Good mechanical contact is established between the corrugated fin elements and the heat pipe housing by brazing. This is readily accomplished by the use of brazing foil, assuring good thermal contact, and enhancing overall effectiveness.

The corrugated fin elements are fabricated by folding techniques, avoiding the complex and problematic micro groove machining of the prior art. Advantageously, this contributes to low cost mass production.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
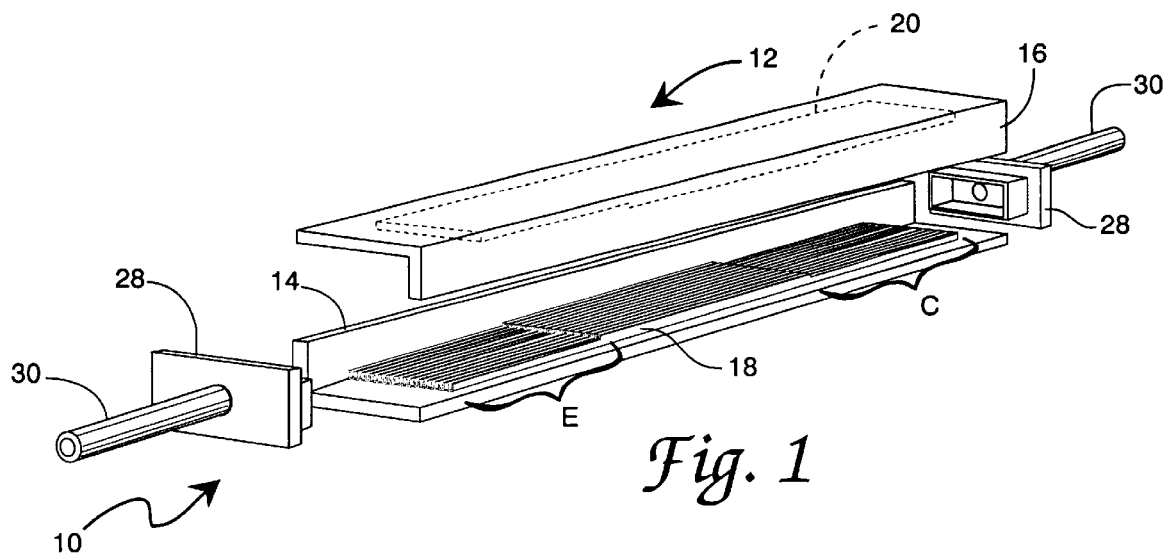
FIG. 1 is an exploded, perspective view of the micro channel heat pipe of the present invention.

Reference is made to the drawing figures showing the micro channel heat pipe of the present invention. The micro channel heat pipe operates automatically and continuously by transferring heat from the heated, evaporator region to the cooler, condenser region, providing a self contained device for efficient heat transfer.

As the trend towards micro miniaturization of electronic components continues, it becomes increasingly difficult to fabricate correspondingly sized micro channel heat pipes. The problem is further compounded by the fact that the heat flux requirements increase as component sizes decrease. As a result, very small dimensions become necessary for efficient capillary channel and corresponding heat pipe operation. Capillary channels in the order of 0.2 mm or less are required for efficient micro channel heat pipe operation. The typical machining methods such as rolling, dicing saw cutting, electrodischarge machining, etc. are difficult to effect properly, can provide unsatisfactory results and are expensive to perform.

Background material related to micro channel heat pipes which may be helpful in understanding the invention may be found by reference to "Micro/Miniature Heat Pipe Technology for Electronic Cooling", by Faghri et al., WL-TR-97-2083, Wright Laboratory, Wright-Patterson AFB, OH (July 1997), and the references cited therein, the entire teachings of which are incorporated by reference herein.

FIG. 1 shows an exploded, perspective view of the micro channel heat pipe 10. The heat pipe 10 includes a housing 12. The housing 12 is generally made from commercially available rectangular cross section tubing. The choice of material of the tubing can be made from many different materials depending on application. For example, copper can be utilized due to its high heat transfer characteristics and ready commercial availability. Other representative choices of material include but are not considered limited to aluminum, stainless steel or nickel alloys, for example. Simply by way of example, and in order to illustrate the teachings and principles of the present invention, a ¼in.× ½in. 0.048 in. wall tube is described. As can be appreciated, the size and configuration of tubing available to the skilled artisan is vast.

Figure 5:
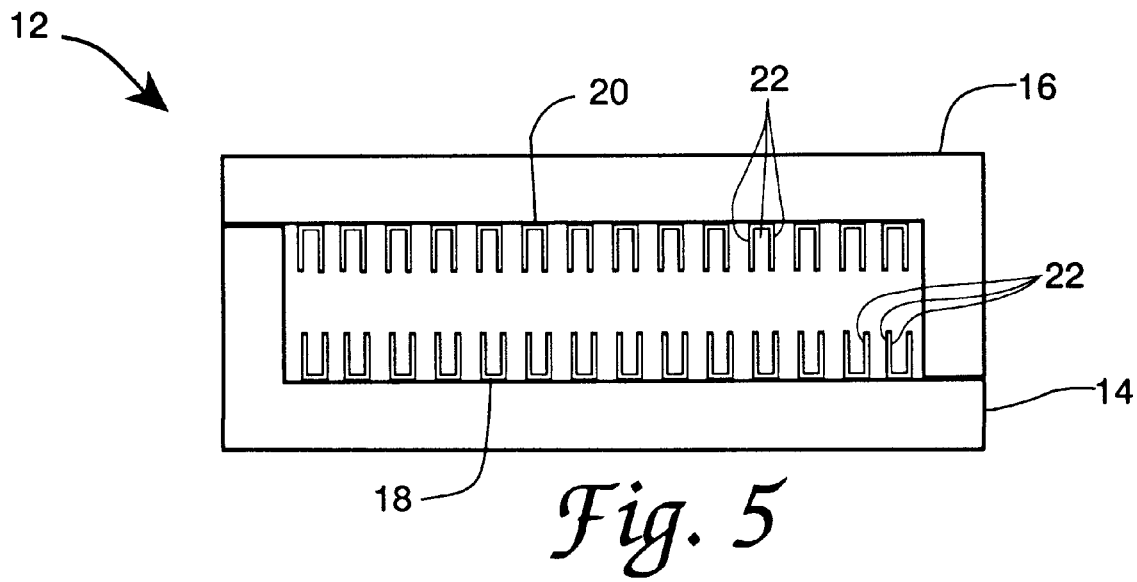
FIG. 5 is an end view of the micro channel heat pipe of the present invention showing the housing halves reattached, prior to attachment of the end caps.

As shown in FIGS. 1 and 5, the housing 12 includes a pair of halves, 14 and 16. During fabrication of the micro channel heat pipe 10 of the present invention, the housing halves 14 and 16 are made by splitting the housing 12 along the longitudinal axis.

Figure 2:
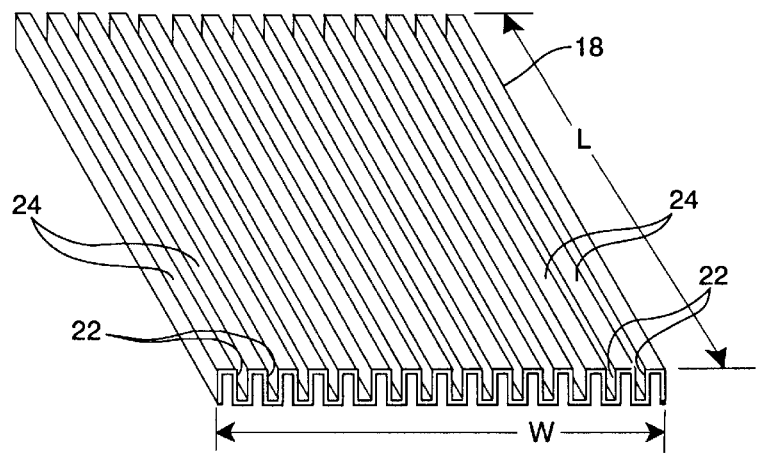
FIG. 2 is a perspective view of one of the corrugated fin elements of the present invention after formation of the micro capillary channels.

The micro channel heat pipe 10 of the present invention includes a pair of corrugated fin elements 18 and 20 for providing heat transfer. The corrugated fin elements 18 and 20 are fabricated from thin sheets of metal foil by repeatedly folding the foil sheet. In the preferred embodiment, the corrugated fin elements are fabricated from copper. The corrugated fin elements 18 and 20, thus fabricated, are shown in FIG. 2. The dimensions L and W, as shown, are dependent on the dimensions of the heat pipe housing, which vary according to application.

Figure 4:
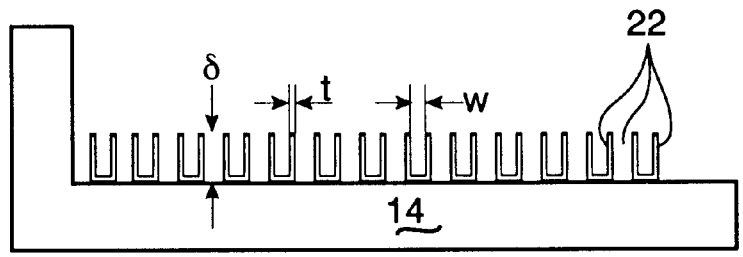
FIG. 4 is an end view of a corrugated fin element after brazing and after material is removed from a portion of the corrugated fin elements.

As shown in FIG. 2, for example, the fin elements 18 and 20 incorporate a plurality of adjacent open and closed micro capillary channels generally designated 22 and 24 respectively. The capillary channel depth δ as shown in FIG. 4, is determined according to a predetermined aspect ratio of δ/w. In the preferred embodiment, the aspect ratio is 4.5, with a capillary channel depth δ of 0.9 mm, a width w of 0.2 mm, a foil thickness t of 0.10 mm and the ratio $r_c/r_h$ of 2.22. Thus the adjacent open and closed micro capillary channels 22, 24 form the corrugations of the corrugated fin element.

Figure 3:
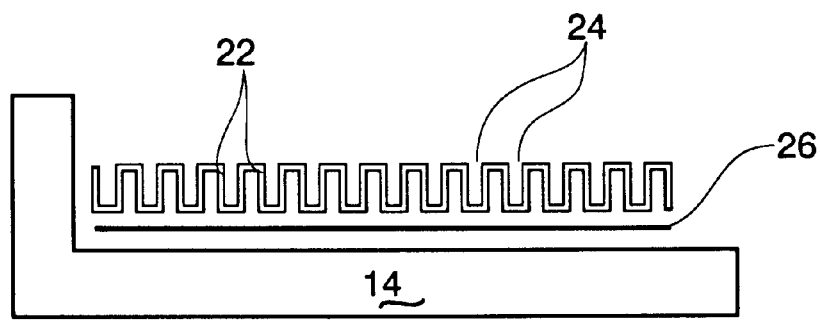
FIG. 3 is an end view of a housing half, showing the brazing foil and corrugated fin element being placed for attachment.

The fin elements 18, 20 are attached to the housing halves, 14, 16 to provide heat transfer. In the preferred embodiment of the present invention, the fin elements 18, 20 are attached by brazing. Reference is directed to FIGS. 3 and 4, showing the sequence of attachment of the fin elements 18, 20. According to known brazing techniques and as shown in FIG. 3, the fin element 18 is placed on a piece of brazing foil 26 which is placed on an inner surface of housing half 14. The housing half 14 is then heated to a sufficient temperature to complete the brazing process. The process is then repeated for the other housing half 16.

Figure 6:
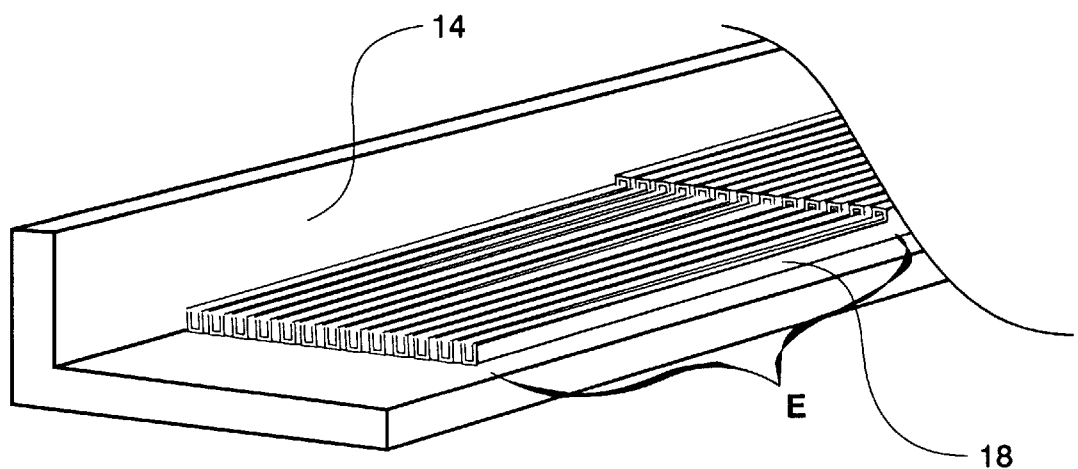
FIG. 6 is a perspective view of a portion of a housing half of the micro channel heat pipe of the present invention, showing the regions of adjacent open micro capillary channels.
Figure 7:
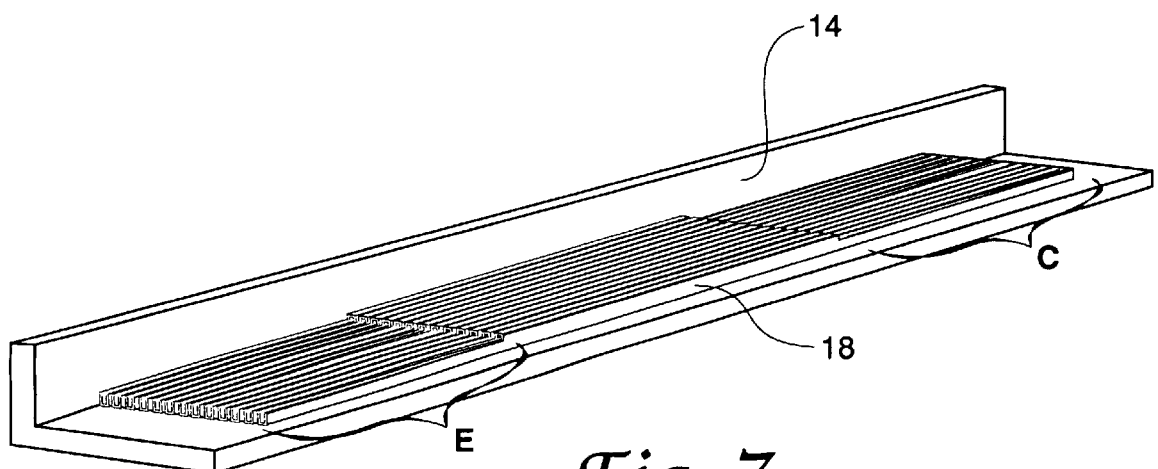
FIG. 7 is another perspective view of a housing half of the micro channel heat pipe of the present invention, showing the regions of adjacent open micro capillary channels.

According to an important aspect of the present invention, the housing halves 14 and 16 are further machined to provide enhanced heat transfer. More specifically, the material covering the closed micro capillary channels 24 is removed by milling or other known techniques. In this way, the closed micro capillary channels 24 are converted to open micro capillary channels 22, enhancing heat transfer. See FIGS. 4 and 7 wherein the completed housing half after the material removal step is shown. As shown, a plurality of adjacent open micro capillary channels 22 are created, to enhance heat transfer. In this way, evaporator and condenser sections, E and C respectively, shown in FIGS. 6 and 7, can be created within the micro channel heat pipe 10. The size, number and location of the evaporator E and condenser C sections are thus readily variable to suit a wide variety of applications and heat flux requirements. As is also shown, a portion of the corrugated fin element 18 is not machined. In this way, a portion of the channels remain closed. This simplifies fabrication, by reducing the amount of material to be removed. As another advantage, depending on application, retaining closed micro capillary channels 24 can enhance heat pipe operation. More specifically, during operation, the working fluid F, described below, after condensation, returns to the evaporator section through both the open and closed micro capillary channels 22 and 24. Sometimes, depending on operating conditions, an undesirable, performance limiting phenomenon known as entrainment can arise. Entrainment occurs when high speed vapor flowing over open grooves removes or strips some of the liquid out of the grooves. By providing closed micro capillary grooves 24, entrainment losses can be reduced.

Figure 9:
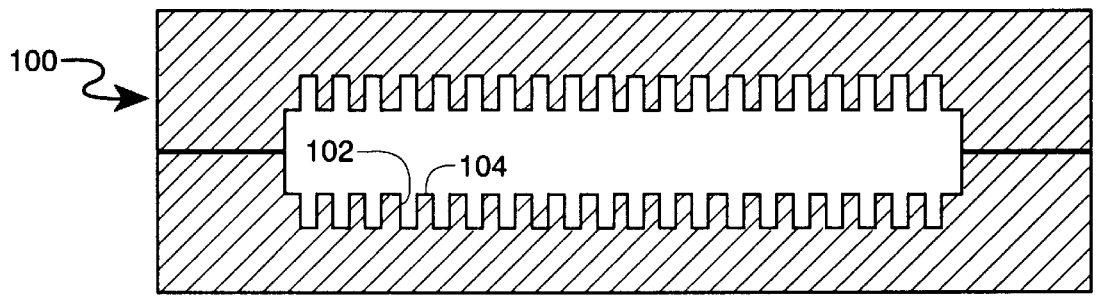

Reference is now made to FIG. 9, showing a micro channel heat pipe 100 made according to the prior art groove machining techniques is shown in cross section. The open capillary channels 102 are separated by solid ridges 104 of housing material. The benefits and advantages of fabricating a micro channel heat pipe 10 according to the teachings of the present invention are dramatically shown. More specifically, the micro channel heat pipe 10 of the present invention presents double the number of open micro capillary channels 22 for heat transfer than are available in the prior art micro channel heat pipe 100. Moreover, the micro channel heat pipe 100 of the prior art is fabricated by difficult and time consuming cutting techniques. The micro channel heat pipe 10 of the present invention can be fabricated much more easily and quickly, facilitating mass production and a low cost product.

Figure 8:
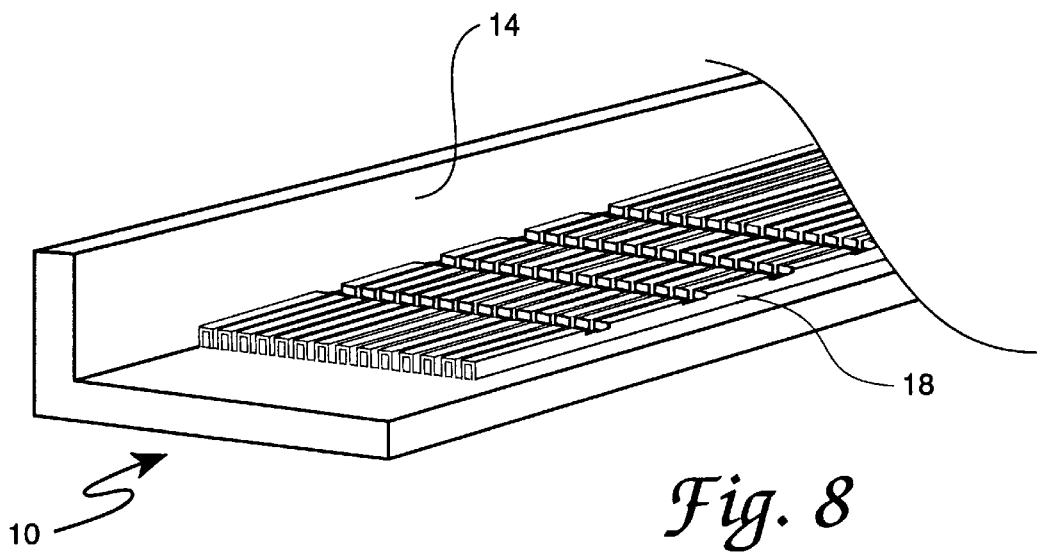
FIG. 8 is a perspective view of a portion of a housing half according to an alternative embodiment of the micro channel heat pipe of the present invention; and, FIG. 9 is a cross sectional view of a prior art micro channel heat pipe.

FIG. 8 shows an alternative embodiment to the micro channel heat pipe 10 of the present invention. As shown, the areas of the corrugated fin element 18 wherein material is removed are smaller in size. This further simplifies fabrication by reducing machining time even further. Other configurations are possible, such as removal of material across the entire longitudinal axis, creating only open micro capillary channels 22. Or, no further machining need be performed after attaching the corrugated fin elements 18 and 20 to the housing halves 14 and 16. While the closed micro capillary channels 24 in this embodiment would thus not contain or transport working fluid F, fabrication costs would be reduced by the avoidance of additional machining and, the resultant micro channel heat pipe would be suitable for many applications at a lesser cost.

As shown in FIG. 5, the housing halves 14 and 16 are reassembled. End caps 28, shown in FIG. 1 are next attached to enclose the housing. The reassembly of the housing halves 14 and 16 as well as attachment of the end caps 28 can be accomplished by the use of brazing foil in a manner similar as that used to attach the corrugated fin elements 18 and 20. Brazing foil having a lower brazing temperature than that used to attach the corrugated fin elements 18 and 20 can be used for these operations. In this way, the housing halves are heated to a lesser temperature, avoiding possible delamination of the corrugated fin elements 18, 20 from the inner surfaces of the housing halves 14 and 16.

Lastly, after completion of the micro channel heat pipe 10, a suitable quantity of working fluid F is introduced therein using known fill procedures, via the fill tubes 30. The working fluid F can be any number of suitable fluids, depending on temperature requirements. Representative fluids include but are not considered limited to water, alcohol, acetone, ammonia or refrigerant. The fill tubes 30 are then pinched and sealed and excess length can be removed, if desired. An alternate filling process may be accomplished with only one fill tube 30, if desired.

In summary, numerous benefits have been described from utilizing the principles of the present invention. In particular, the micro channel heat pipe 10 utilizes a pair of corrugated fin elements 18 and 20 having a plurality of micro capillary channels formed therein to provide enhanced heat transfer operation and presenting relative ease of fabrication.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

We claim:

1. A method of fabricating a micro channel heat pipe, comprising the steps of:

providing a tubular housing having a longitudinal axis;

splitting said housing along said longitudinal axis into two halves;

fabricating a pair of corrugated fin elements, each said fin element having a longitudinal axis and a plurality of adjacent closed and open micro capillary channels along said longitudinal axis;

attaching each one of said fin elements to an inner surface of each one of said housing halves;

removing material from said closed micro capillary channels to create open micro capillary channels along at least a portion of said longitudinal axis;

reattaching said housing halves;

attaching a pair of end caps to enclose said housing; and, introducing a sufficient quantity of working fluid into said housing.

2. The method of claim 1 wherein said housing comprises material selected from the group consisting of copper, aluminum, stainless steel and nickel alloys.

3. The method of claim 1 wherein said working fluid is selected from the group consisting of water, alcohol, acetone, ammonia and refrigerant.

4. The method of claim 1 wherein said fin elements are attached to said housing halves by brazing.

5. The method of claim 4 wherein said brazing step is performed by the use of brazing foil.

6. The method of claim 1 wherein said end caps are attached by brazing.

7. The method of claim 6 wherein said brazing step is performed by the use of brazing foil.

8. A method of fabricating a micro channel heat pipe, comprising the steps of:

providing a tubular housing having a longitudinal axis;

splitting said housing along said longitudinal axis into two halves;

fabricating a pair of corrugated fin elements, each said fin element having a longitudinal axis and a plurality of adjacent closed and open micro capillary channels along said longitudinal axis;

attaching each one of said fin elements to an inner surface of each one of said housing halves;

reattaching said housing halves;

attaching a pair of end caps to enclose said housing; and, introducing a sufficient quantity of working fluid into said housing.

9. The method of claim 8 wherein said housing comprises material selected from the group consisting of copper, aluminum, stainless steel and nickel alloys.

10. The method of claim 8 wherein said working fluid is selected from the group consisting of water, alcohol, acetone, ammonia and refrigerant.

11. The method of claim 8 wherein said fin elements are attached to said housing halves by brazing.

12. The method of claim 11 wherein said brazing step is performed by the use of brazing foil.

13. The method of claim 8 wherein said end caps are attached by brazing.

14. The method of claim 13 wherein said brazing step is performed by the use of brazing foil.

* * * * *